US008103714B2

(12) United States Patent
Dorai et al.

(10) Patent No.: US 8,103,714 B2
(45) Date of Patent: Jan. 24, 2012

(54) TRANSACTIONAL QUALITY OF SERVICE IN EVENT STREAM PROCESSING MIDDLEWARE

(75) Inventors: Chitra Dorai, Chappaqua, NY (US); Robert E. Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 12/192,876

(22) Filed: Aug. 15, 2008

(65) Prior Publication Data

US 2010/0042999 A1 Feb. 18, 2010

(51) Int. Cl.
*G06F 15/16* (2006.01)

(52) U.S. Cl. .................................... 709/201; 709/231

(58) Field of Classification Search .................. None
See application file for complete search history.

(56) References Cited

U.S. PATENT DOCUMENTS

| 5,263,155 | A | 11/1993 | Wang |
| 5,355,477 | A | 10/1994 | Strickland et al. |
| 7,028,071 | B1 * | 4/2006 | Slik ............... 709/201 |
| 7,146,366 | B2 | 12/2006 | Hinshaw et al. |
| 7,206,805 | B1 * | 4/2007 | McLaughlin, Jr. ........... 709/203 |
| 7,310,638 | B1 * | 12/2007 | Blair .................. 707/999.003 |
| 7,383,253 | B1 * | 6/2008 | Tsimelzon et al. .......... 707/610 |
| 7,925,777 | B2 * | 4/2011 | Levett ................. 709/238 |
| 2006/0129578 | A1 * | 6/2006 | Kim ............... 707/100 |
| 2006/0190358 | A1 * | 8/2006 | Slik ................. 705/27 |
| 2006/0265365 | A1 * | 11/2006 | Chkodrov et al. .......... 707/3 |
| 2006/0282695 | A1 | 12/2006 | Mital et al. |
| 2007/0288254 | A1 * | 12/2007 | Eisner ................ 705/1 |
| 2009/0006320 | A1 * | 1/2009 | Ding et al. ............... 707/2 |
| 2009/0248631 | A1 * | 10/2009 | Alba et al. ............... 707/3 |
| 2010/0228650 | A1 * | 9/2010 | Shacham et al. ............ 705/34 |

FOREIGN PATENT DOCUMENTS

| EP | 743609 A2 * | 11/1996 |
| JP | 2006115512 | 4/2006 |

OTHER PUBLICATIONS

"A reuse mechanism for object containers." IBM Technical Disclosure Bulletin. Mar. 2001. UK. Issue 443, p. 471. Mar. 1, 2001. NNRD443135. 4 pages.* Zeng, Liangzhao et al. "QoS-Aware Middleware for Web Services Composition." IEEE Transactions on Software Engineering. vol. 30 No. 5. May 2004. 311-27.*

(Continued)

*Primary Examiner* — Jeffrey R Swearingen
(74) *Attorney, Agent, or Firm* — Yee & Associates, P.C.; Louis J. Percello

(57) ABSTRACT

Computer implemented method, system and computer usable program code for achieving transactional quality of service in a transactional object store system. A transaction is received from a client and is executed, wherein the transaction comprises reading a read-only derived object, or reading or writing another object, and ends with a decision to request committing the transaction or a decision to request aborting the transaction. Responsive to a decision to request committing the transaction, wherein the transaction comprises writing a publishing object, events are delivered to event stream processing queries, and are executed in parallel with executing of the transaction. Responsive to a decision to request committing a transaction that comprises reading a read-only derived object, a validation is performed to determine whether the transaction can proceed to be committed, whether the transaction should abort, or whether the validation should delay waiting for one or more event stream processing queries to complete.

20 Claims, 5 Drawing Sheets

OTHER PUBLICATIONS

Jeon, Won et al. "QoS-Aware Middleware Support for Collaborative Multimedia Streaming and Caching Service." Microprocessors and Microsystems. vol. 27 Issue 2, Mar. 15, 2003. Elsevier Science. 65-72.*

Huai-Ming et al., "Implementation of Configuration Service of a Database Middleware", INSPEC, Mini-Micro System, vol. 28, No. 3, 2007. pp. 438-442.

Venkatasubramanian, "A Formal Model for Reasoning About Adaptive QoS-Enabled Middleware", ACM Transaction, on Software Engineering and Methodology, vol. 13, No. 1, Jan. 2004, pp. 86-147.

Bhatti et al., "Coyote: A System for Constructing Fine-Grain Configurable Communication Services", ACM Transactions on Computer Systems, vol. 16, No. 4, Nov. 1998, pp. 321-366.

* cited by examiner

```
boolean active = false;
try {
        session.begin();
        active = true;
        ... - operations on ObjectMaps
        session.commit();
        active = false;
}
finally {
        if (active) session.rollback ();
}
```

TRANSACTIONAL QUALITY OF SERVICE IN EVENT STREAM PROCESSING MIDDLEWARE

BACKGROUND OF THE INVENTION

1. Field of the Invention

The present invention relates generally to event stream processing systems and, more specifically, to a computer implemented method system and computer usable program code for providing transactional quality of service in event stream processing middleware.

2. Description of the Related Art

Conventional messaging middleware supports simple queuing, routing and filtering of events delivered from producers to consumers. Event stream processing systems extend this capability by allowing consumers to write continuous queries over one or more event streams from producers, and receive results that are continuously updated as new events are received or, in some circumstances, as time passes without new events arriving.

In an event stream processing system, consumers can request views defined via either stateless or stateful functions of stream histories. A stateful function is a function wherein the processing of each event in a stream may depend upon previous events from that stream or from a different stream. Stateful functions include, for example, joins, aggregations, and top-k. Sample queries may include, "tell me the average trading price of the 10 highest-volume trading issues", or "alert me whenever two ATM transactions from the same customer appear at different ATMs within an excessively short time window."

Event stream processing queries are deployed over a long time period, and their results are constantly refreshed in near real-time. Producers and consumers can be remote; and event stream processing middleware is responsible for generating and deploying an appropriate query execution plan, and for recovering from network and server failures.

A unique quality of service introduced for event stream processing systems is a rigorous safety and liveness service guarantee called "eventual correctness." Eventual correctness is a counterpart to the ACID (Atomicity, Consistency, Isolation, Durability) guarantee of databases, but is more practical for highly scaled and widely distributed systems. Event stream processing systems such as the "SMILE" (Smart Middleware, Light Ends) event stream processing system have incorporated mechanisms for achieving this eventual correctness guarantee in the presence of server and link failures.

As a result of the success of event stream processing systems, sometimes also referred to herein as "event streaming systems", demands have arisen to integrate such systems with other systems, such as application server systems, enterprise service bus systems, and transactional object store systems.

The integration of an event streaming system with a transactional object store system, in particular, presents challenges as the two systems have very distinct quality of service guarantees. A transactional object store, as implied by its name, guarantees a full transactional quality of service for its applications; while an event streaming system may, as indicated above, support the eventual correctness guarantee. When the two systems are integrated, updates to certain objects generate events for the streams; and derived views are then reflected back to appear as derived objects. This presents no problem so long as there are two distinct kinds of applications: (1) object store transactions that read and write original objects and receive a transactional quality of service, and (2) continuous query subscribers that receive continuous updates to derived views and receive an eventual correctness quality of service.

An emerging requirement, however, is for applications that may wish to access both original and derived objects. Such applications expect transactional consistency for all objects they access whether original or derived. A need exists, therefore, for a mechanism that will achieve a transactional guarantee and, at the same time, preserve the asynchronous nature of stream processing systems in an implementation of a combined event stream processing and transactional object store system.

BRIEF SUMMARY OF THE INVENTION

According to one embodiment of the present invention, transactional quality of service is achieved in a transactional object store system. The transactional object store system has at least one client issuing transaction requests, at least one publishing object, at least one read-only derived object, and at least one event stream processing query, wherein a change to the at least one publishing object defines an event to be delivered to one or more of the at least one event stream processing query, wherein a state of the at least one read-only derived object represents a result of an event stream processing query, and wherein the at least one event stream processing query repeatedly receives one or more events from one or more of the at least one publishing object, determines a result based on a history of events from the one or more publishing object, and delivers the result to a read-only derived object of the at least one read-only derived object. A transaction is received from a client of the at least one client. The transaction is executed, wherein the transaction comprises one of reading a read-only derived object of the at least one read-only derived object, reading another object or writing another object, and wherein the transaction ends with one of a decision to request committing the transaction or a decision to request aborting the transaction. Responsive to a decision to request committing the transaction, wherein the transaction comprises writing one of the at least one publishing object, events are delivered to event stream processing queries, and the delivered event stream processing queries are executed in parallel with the executing of the transaction. Responsive to a decision to request committing a transaction that comprises reading the read-only derived object, a validation is performed to determine whether the transaction can proceed to be committed, whether the transaction should abort, or whether the validation should delay waiting for one or more event stream processing queries to complete. If a first transaction updates a publishing object that triggers an event processing query that updates a derived object, any second transaction occurring logically later must see the updated value of the derived object.

DETAILED DESCRIPTION OF THE INVENTION

Figure 1:
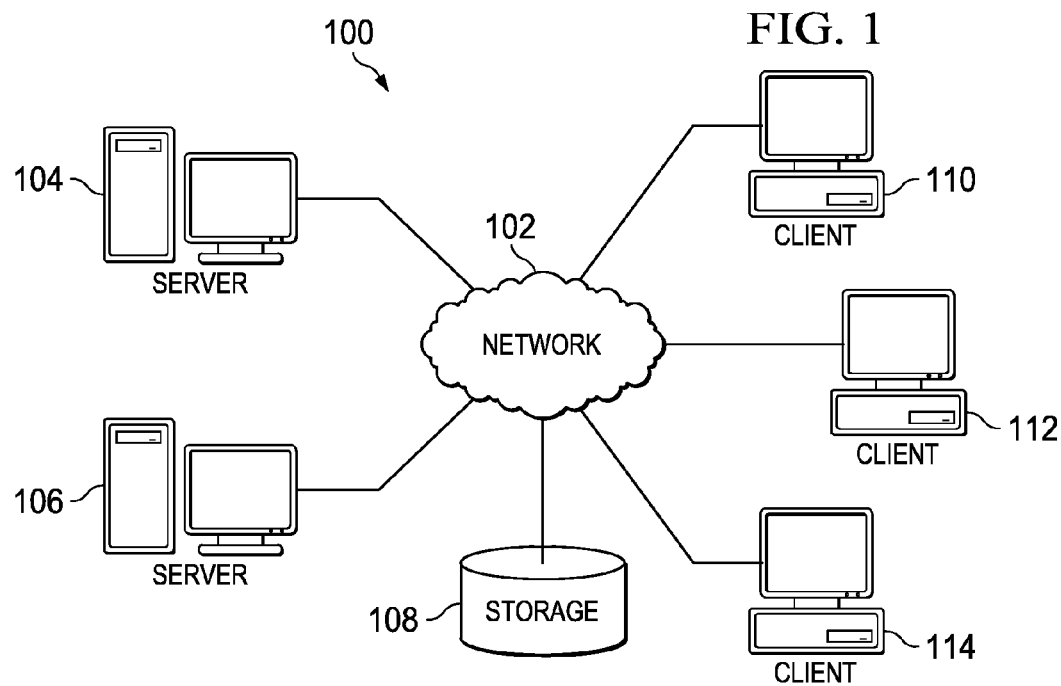
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
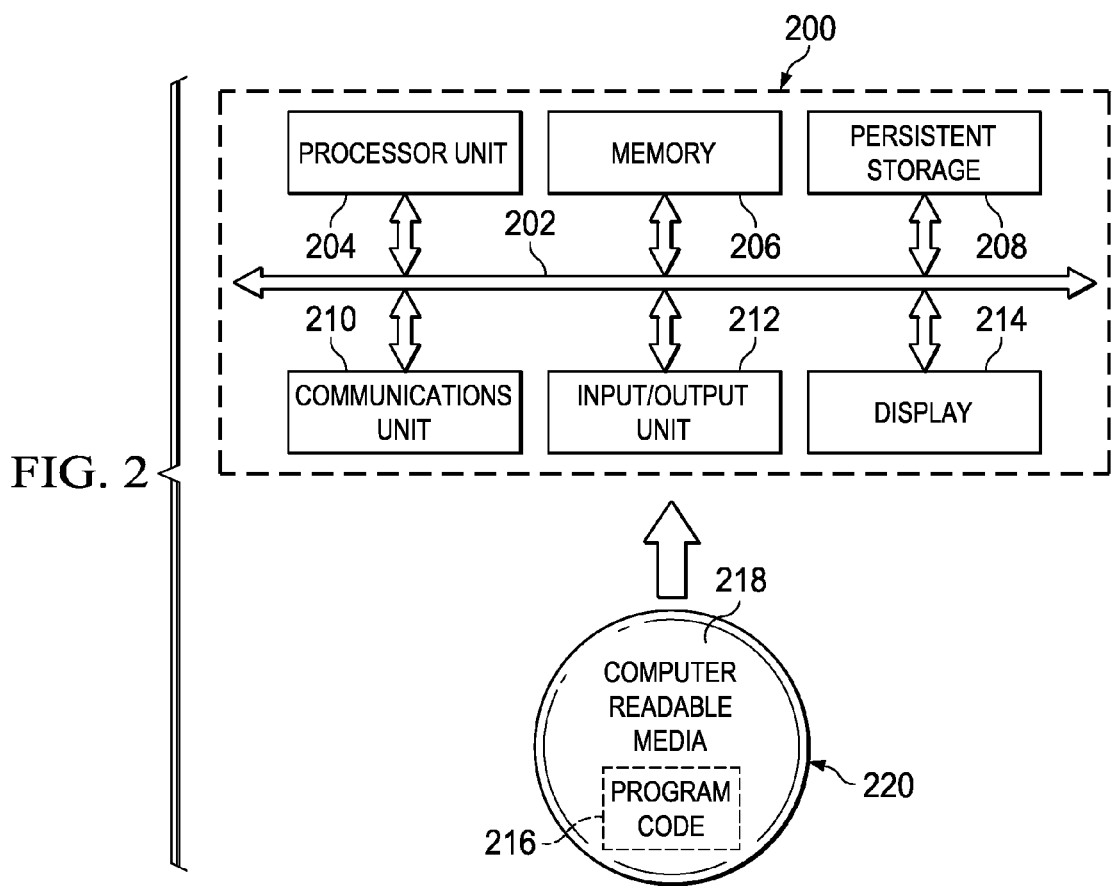
FIG. 2 is a diagram of a data processing system in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments provide an event stream processing system, for example, a SMILE event stream processing system, federated with a transactional object store system, for example, a WebSphere XD™ ObjectGrid system. A combined, or hybrid, event stream processing system and transactional object store system according to illustrative embodiments of the invention supports transaction mixes, including ordinary transactions on objects, transactions that publish to SMILE, transactions that read derived views, as well as mixed transactions that may include several types of operations. Although illustrative embodiments described hereinafter may refer to specific systems, it should be understood that the mechanisms and performance analysis presented are applicable to any federation of an event streaming engine and a transactional engine.

In order to facilitate a clear understanding of illustrative embodiments, a description of the original specifications for the SMILE event stream processing system and the ObjectGrid (OG) transactional system will be presented. In an OG transactional system, objects are implemented by a combination of caches, referred to as "ObjectMaps", and backing stores, referred to as "Loaders."

An object store supports a set of potentially concurrent sessions. Within each session, applications access data in the object store through ObjectMaps. After connecting to one or more ObjectMaps, a user invokes transactions via code pattern 300 illustrated in FIG. 3. Each ObjectMap supports the usual Java Map operations: get, put, insert, containsKey and remove. Additional operations include update (the same as put except it is an error if the entry did not previously exist), and getForUpdate (the same as get except this operation hints to a concurrency control mechanism that an update will follow).

The OG transactional system provides a standard serializability guarantee, that is, the system behaves as if only committed transactions executed, and as if all operations of the committed transactions had been executed by a single thread in a serial, non-overlapping order, one transaction at a time. These guarantees are implemented using standard concurrency control protocols. At commit time, the OG system logs copies of each updated object to a stable store and/or to a backup machine that is assumed not to crash when the main machine crashes.

The SMILE event stream processing system is a "stateful publish-subscribe" event stream processing system that supports the following:

Defining stream schemas: Users define one or more stream schemas, which specify the attributes of events of each stream. A stream is a history of published events conforming to a stream schema. During execution of the SMILE system, streams grow monotonically as new events are published Defining views via continuous queries: Users may introduce SQL (Structured Query Language) expressions defining tables (views) in terms of relational operations on either streams or on previously defined views. As new events are added to streams, the values of the views may change. The SMILE system will compute and propagate these updates as quickly as possible.

Deploying a collection of stream schemas and view definitions.

Connecting as a publisher: After deployment, clients may connect to the SMILE system as publishers, by naming the particular stream to which they will publish events. Successful connection returns a Stream object, which supports operations to create a new event, populate the fields of that event, and publish it to the stream.

Connecting as a subscriber: After deployment, clients may connect to the SMILE system as subscribers. A client names a view to which he will subscribe. The client may then either access the derived view using usual Map operations, or may attach a listener, which will receive a notification each time a row in the view changes.

The SMILE event stream processing system is typically deployed on a wide-area distributed system, which may potentially be global in scope and span large numbers of views with large numbers of subscribers to each view. In many deployments, particularly when subscribers are widely distributed, transactionality is neither feasible nor expected. The SMILE system guarantees "eventual correctness". Eventual correctness is formally defined relative to a monotonic type model. Informally, it means that subscribers will never see incorrect results, though they may see results that lag behind a timely result. And for every "snapshot" representing a partial history on a set of streams, the subscriber will eventually see either the exact result of that partial history or a later result. The question of transactional consistency does not arise in current implementations of the SMILE system, since the SMILE system has no mechanism for an observer to initiate transactions that could "simultaneously" examine a stream and a view or examine multiple views.

The SMILE event stream processing system is currently implemented by one or more threads executing flow graphs of transforms that incrementally update derived views as incremental changes to streams are received. The SMILE system maintains state within these transforms. Fault tolerance is achieved by: (1) logging input events to streams, assigning each event a timestamp; (2) periodically taking "soft checkpoints" of transform state; and (3) detecting gaps in streams and replaying lost messages of streams in timestamp order as needed to recover state, exploiting the determinism of transforms.

In a known federation of a SMILE event stream processing system and an OG system, users can use either SMILE or OG in isolation. Alternatively, users can connect the two systems as follows: Certain OGMaps (which may be referred to as "publisher maps") are designated as providing SMILE input. A post-commit trigger on these publisher maps causes SMILE events to be generated at the end of any transaction that modifies one or more publisher maps, one event for each change to a publisher map. These SMILE events are published into the SMILE engine, which eventually updates one or more derived views. An adapter causes a derived view to appear to the user as an OGMap (which may be referred to as a "derived map"). In effect, once the SMILE stream definitions and queries are deployed, SMILE is hidden from the user. User transactions access OGMaps, including publisher maps and derived maps uniformly (except that derived maps can only be read and cannot be written).

Although the above-described federation of a SMILE event stream processing system and an OG system unifies the external model—everything seen by users is now an OGMap—the unity of the programming interface belies the inconsistency of the correctness models of the two systems. This inconsistency can best be understood with reference to FIG. 4. In particular, FIG. 4 is a diagram that schematically illustrates an example of an incorrect behavior in a combined event stream processing system and transactional object store system to assist in explaining illustrative embodiments of the present invention.

Figures 3, 4:
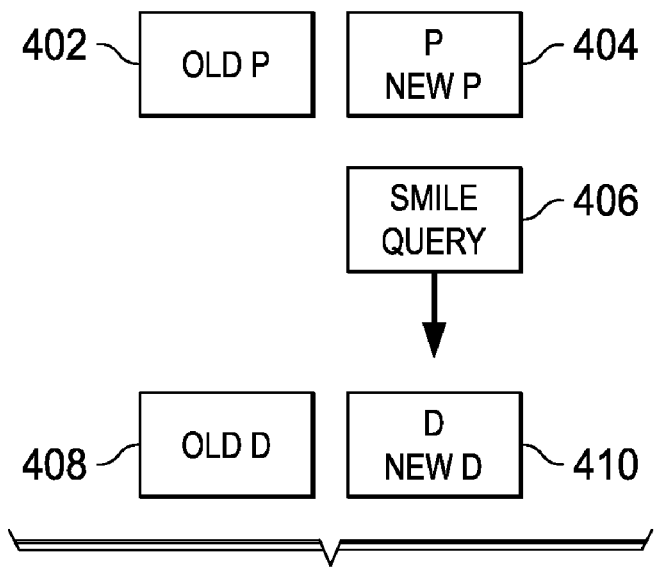
FIG. 3 illustrates a code pattern by which a user invokes transactions in an ObjectGrid transactional system to assist in an understanding of illustrative embodiments of the present invention.
FIG. 4 is a diagram that schematically illustrates an example of an incorrect behavior in a combined event stream processing system and transactional object store system to assist in explaining illustrative embodiments of the present invention.

With reference to FIG. 4, suppose a transaction T1 updates a publisher map P (old P 402), resulting in new P 404, which triggers a SMILE event (query) 406 that causes a derived map D (old D 408) to be updated (to new D 410). Query 406 should update D as part of transaction T1, but actually executes after T1 commits. As a result, it is possible for a later transaction T2 to see the updated value of P (new P 404) and the old value of D (old D 408). T2 can be logically later than T1, for example, as a result of T2 reading a value written by T1, by T2 overwriting a value that T1 read the old value of, or by T2 logically following some other transaction that logically follows T1. This inconsistency is a straightforward consequence of the fact that updates to derived map D happen asynchronously in a separate thread whose execution may take place after T2's read of map D.

Suppose also that the machine hosting the OG system crashes. A backup machine will then restore the state of all OGMaps as of the last committed transaction. But the state kept by the SMILE system for incrementally computing changes to the derived maps would not be restored to a consistent point in time, as it has not coordinated with the OG recovery mechanism.

Inconsistent behavior such as above does not meet the strong requirements of full transactionality in a federated event stream processing system/transactional object store system.

In accordance with an illustrative embodiment, a federated event stream processing system/transactional object store system, for example, a federated SMILE/OG system is provided in which OGMaps derived from SMILE behave just like any other OGMaps with respect to transactions, except that they may only be read by user transactions and not written. The federated system model may be described as follows: Let U=P 4 N be a set of read/write objects in ObjectMaps of OG, partitioned into a set P containing the objects of publisher maps (also referred to as "publisher objects" or "P-objects"), and a set N of other objects (called "N-objects"—objects in the transactional store that are neither publisher objects nor derived objects). Let E be the history of events representing changes to the objects in P. The events in E are published to SMILE, where a set of streaming queries Q has been deployed. Let D be the set of objects in derived maps ("derived objects" or "D-objects"), and V the current state of D, such that the relationship V=Q(E) is continuously maintained.

The federated system behaves as if each transaction is composed of two parts: (1) a user transaction component, which may read any object in U 4 D and may update any object in U, and may terminate by either committing or aborting; and (2) an event stream processing component, which is under the control of previously deployed event streaming queries, and which processes events representing changes to P-objects and updates the state of D-objects, and cannot be aborted by the user.

Requirements of the federated system are introduced as the following guarantees:

Updates to derived views appear to take effect within the transaction that published an event (G1): Let T be a transaction that includes updates to one or more objects in P, extending E with additional events to E'. Then the induced updates extending V to V', (such that V'=Q(E')), will appear as if they happened within T.

Transactional semantics are preserved in the presence of failure (G2): Despite failures in either OG or SMILE, committed transactions will continue to behave as if they executed in some over-lapping serial order.

An objective is to continue to maintain G1 and G2 while preserving the existing asynchronous implementation of SMILE.

OG may use either optimistic or locking protocols, at the user's choice, to preserve proper transactionality for objects in U. Illustrative embodiments described hereinafter consider only the case in which locking is used. In the illustrative embodiments described hereinafter, nothing depends upon the granularity used for objects—the objects may be entire maps, individual rows or groups of rows.

As with most standard locking protocols, as transactions read or write objects, shared locks (in the case of reads) or exclusive locks (in the case of writes) are acquired by OG. Transactions will roll back either when the program explicitly issues a rollback operation, or whenever a circular dependency in the "waits-for" relationship among transactions is detected. Otherwise, if a transaction becomes committable, the implementation invokes a standard protocol to record the fact of the commit after replicating enough state to reconstruct the actions of the transaction.

A straightforward way to maintain guarantees G1 and G2 would be to place SMILE under the same concurrency control system as the rest of OG. That is: just before committing the transaction, generate the new events, push the events through the SMILE system's flow graph, and update the SMILE system's internal state as well as the derived views as part of the transaction.

This "straightforward approach", however, will require delaying committing of each transaction that publishes events until SMILE has processed the events, and will also force each individual update by SMILE to be logged, defeating the asynchronous execution of SMILE, and undermining the optimizations associated with the fault-tolerance mechanisms in SMILE. Instead, an optimistic approach is provided that exploits the following properties of the federated system:

Stream processing transaction components can run independently: Provided that no serialization conflicts occur, a user transaction can safely commit and schedule the stream processing computations for later asynchronous execution because: (1) the stream processing computations are pre-determined and cannot abort, and (2) their results are not needed to compute the result of the user transaction.

Few conflicts: Most transactions that read derived objects will not also read or update published objects. Of those transactions that do, most will not execute during the "window of vulnerability" where the published object has a new value and the derived object still has the old value. This means that optimistic reading of derived results will usually succeed.

In accordance with illustrative embodiments, the serializability of the protocol is assured as follows: Each transaction is associated with a logical time. During each transaction, it is checked that the reads and writes performed by that transaction can validly occur at that logical time, adjusting the logical time, if necessary, and generating optimistic assumptions, if necessary. At the end of the transaction, if unconfirmed optimistic assumptions remain, the transaction waits until they can be validated; the transaction will then either commit or abort based on the results of the validation.

Details of the approach according to an illustrative embodiment will now be discussed. In the approach, each transaction is associated with a logical time $t_T$. The order in which transactions appear to execute is defined by the order of these logical times. Logical times are represented by a pair of numbers <major ticks, subticks>. Major ticks represent the times of events published into SMILE. Successive published events are guaranteed to be delivered to SMILE in strictly monotonic order. Subticks represent small numbers less than a major tick that are used to order transactions between major ticks.

The increment of one subtick is denoted by ⧈. Without loss of generality, it is assumed that all transactions that both read and write an object perform the read first.

The following invariants are guaranteed during a transaction:
(I1) If a transaction T having a logical time of $t_T$ reads an object O, the value it reads is always one written by a transaction that had the latest logical time earlier than $t_T$ from among all transactions that wrote O.
(I2) If a transaction T with a logical time of $t_T$ reads an object O, no subsequently committed transaction that writes O will be assigned an earlier logical time.

Invariants I1 and I2 assure that the property that transactions appear to execute in the order of their logical times is a stable property—that is, if it is true for a given set of committed transactions, it will remain true as additional transactions are committed. Committed transactions obey these properties. Transactions in progress start by obeying these properties. For each new operation, one of the following will happen: (a) the invariant continues to hold; (b) the logical time will be readjusted to maintain the invariant; (c) the transaction will enter optimistic mode, that is, the transaction is committable only if an assumption is validated in the future (or is aborted if the assumption is discovered to be false). When the transaction finishes, it will commit immediately unless it is in optimistic mode; otherwise it will wait for the assumption to either be validated or invalidated, and then it will either commit or abort.

For each object O, the time of the latest transaction that read or wrote it is recorded (the transaction is referred to as r(O) if the latest access was a read, and w(O) if the latest access was a write). This information needs to be retained in memory only for the reads and writes to the most recently committed transaction.

While a transaction T is running, it has a "tentative transaction time" which is referred to as $t_T$. $t_T$ is initialized to some initial value $t_0$. During execution, the tentative value $t_T$ may increase. If serializability were the only criterion that mattered, $t_0=0$ could be used. However, typically it would be anomalous if successive transactions on the same session from the same client were to be assigned out-of-order logical times. To avoid this anomaly, $t_0$ is initialized to the logical time of the previously committed transaction on the same session.

Figure 5:
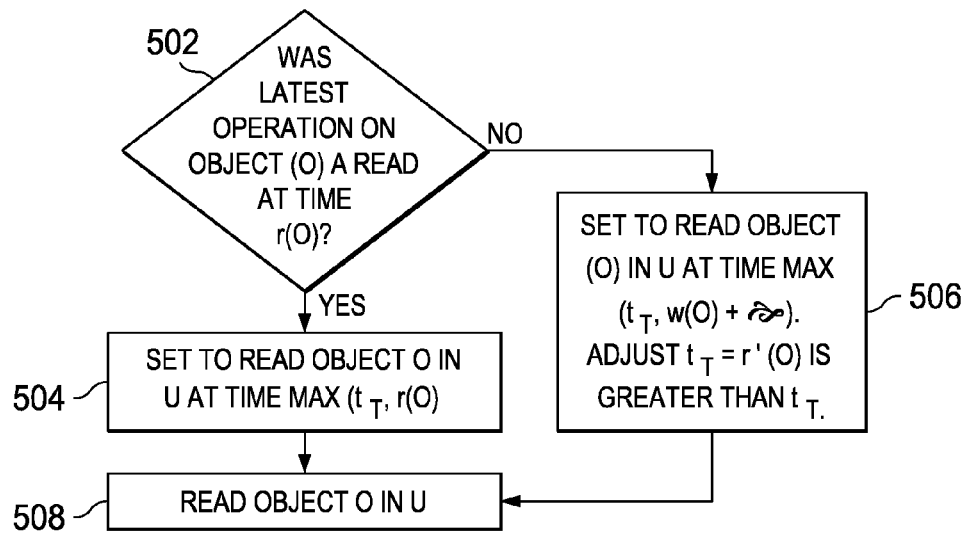
FIG. 5 is a flowchart that illustrates a method for reading an object according to an illustrative embodiment of the invention.
Figure 6:
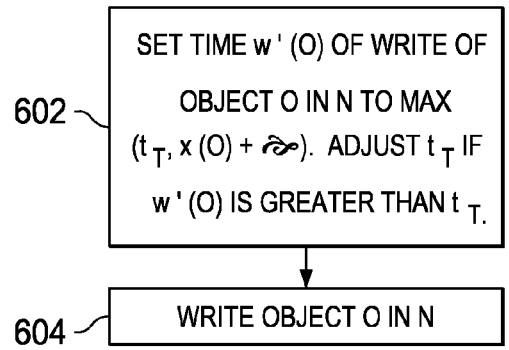
FIG. 6 is a flowchart that illustrates a method for writing an object according to an illustrative embodiment of the invention.
Figure 7:
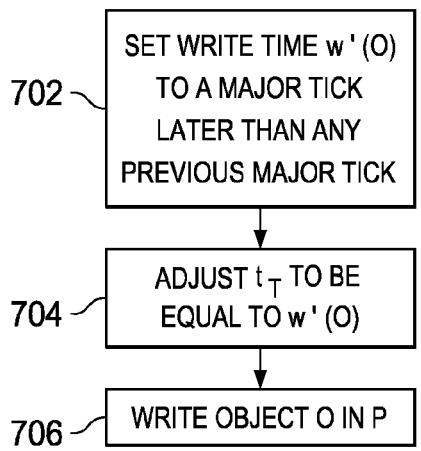
FIG. 7 is a flowchart that illustrates a method for writing an object according to an illustrative embodiment of the invention.
Figure 8:
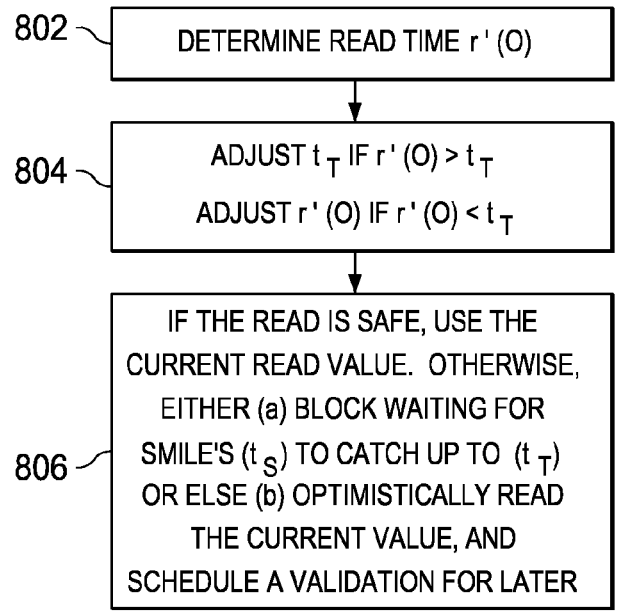
FIG. 8 is a flowchart that illustrates a method for reading an object according to an illustrative embodiment of the invention.

As a transaction performs operations, the $t_T$, the r(O) and/or the w(O) of the objects O it accesses are updated. The following cases are distinguished with reference to FIGS. 5-8. In particular, FIG. 5 is a flowchart that illustrates a method for reading an object O in the set U, according to an illustrative embodiment of the invention, FIG. 6 is a flowchart that illustrates a method for writing an object O in the set N, according to an illustrative embodiment of the invention, FIG. 7 is a flowchart that illustrates a method for writing an object O in the set P, according to an illustrative embodiment of the invention, and FIG. 8 is a flowchart that illustrates a method for reading an object O in the set D, according to an illustrative embodiment of the invention.

Reading an object O in U (see FIG. 5): It is first determined whether the latest operation on O was a read at time r(O) or a write at time w(O) (Step 502). If the latest operation on O was a read at time r(O) (Yes output of Step 502), then the time of this read of object O in U, r'(O), is set to be max($t_T$, r(O)) (Step 504). If the latest operation O was a write at time w(O) (No output of Step 502), then the time of this read of object O in U, r'(0), is set to be max($t_T$, w(O)+⧈) (Step 506). If r'(O) is greater than $t_T$, then $t_T$ is adjusted to be equal to r'(O), and the object O is then read (Step 508). This adjustment may cause an abort or a switch to optimistic state as will be described hereinafter.

Writing an object O in N (see FIG. 6): The time, w'(O) of the write is set equal to max($t_T$, x(O)+⧈), where x(O) is the latest time of a read or write operation to O (Step 602). If w'(O) is greater than $t_T$, then $t_T$ is adjusted to be equal to w'(O). As before, this adjustment may cause the transaction to abort or to switch to an optimistic state. The object O is then written in N (Step 604).

Writing an object O in P (see FIG. 7): Because writing to O publishes an event to SMILE, there is a constraint in that the logical time of this event is later than the logical time of any other events sent to SMILE (because each time a new event is sent to SMILE at a time t, it assumes that there are no unsent events with earlier times than t). The write time, w'(O) is set to a major tick later than any previous major tick (Step 702).

Then $t_T$ is adjusted to be equal to w'(O) (Step 704). As before, this adjustment may cause the transaction to abort or to switch to an optimistic state. The object O is then written in P (Step 706).

Reading an object O in D (see FIG. 8): Let $t_U$ be the time the object O was last written by SMILE. Let $t_S$ be the time when the SMILE thread last finished processing a query (the query may or may not have updated O). The read time r'(O) is defined as max($t_U$, $t_S$)+⧈. The read time r'(O) is determined (Step 802). Then, as shown in Step 804, if r'(O)>$t_T$, $t_T$ is adjusted (which can cause an abort, as will be discussed below). If r'(O)<$t_T$, then r'(O) must be adjusted to be equal to $t_T$. If r'(O)=$t_T$, the read is safe. But if r'(O)>$t_S$, then at this point the algorithm may do one of two things: (a) block, waiting for SMILE to catch up to $t_T$ so that we can be sure to read a consistent value, or (b) read the value as of the earlier time $t_U$+⧈, and immediately enter optimistic state, hoping that this value will be the same as the value read at the proper time $t_T$ (Step 806).

As discussed above, some operations will cause $t_T$ to be adjusted to a later time. When this occurs, the imputed read or write times of all other objects previously read or written in the transaction are adjusted to also equal $t_T$. For objects in U, this adjustment will always be safe, because: (1) the value read or written was always the latest value of that object known at the time it was read or written, and (2) the object was locked, preventing any subsequent write to that value. However, if an object was previously read from D, this adjustment is not always safe, since SMILE objects are not locked, and are asynchronously updated. This can yield three cases:

The SMILE thread has caught up with the new $t_T$, and no change has happened to the object(s) in D previously read at an earlier logical time. In this case, the adjustment is safe. "Caught up with $t_T$" means that there are no pending events resulting from writes to objects in P at times earlier than $t_T$.

The SMILE thread has advanced (possibly all the way to the new $t_T$) and one of the objects previously read at an earlier logical time has been updated and now has a different value from the one read. In this case, the previously read value was inconsistent and the transaction must be aborted.

The SMILE thread has not yet caught up with the new $t_T$, although no invalidating update has happened yet. In this case, it is not known whether the adjustment will be safe or not. The best that can be done is to hope that the adjustment will be safe. The transaction enters an optimistic state, meaning that it schedules a future validation check. The validation check will verify that no D object read in this transaction has been modified at a virtual time between its original read time and $t_T$. This check cannot be performed until the SMILE thread catches up with time $t_T$.

At the end of all operations, if there has not been an aborting due to a user issuing an explicit rollback, the locking system detecting a deadlock, or the detection of an inconsistent read, the system is ready to commit. There are several possibilities:

The transaction has a known logical time $t_T$, and is not in an optimistic state. In this case, invariants I1 and I2 hold.

The transaction is in optimistic state. It waits for SMILE to catch up to $t_T$. Invariants I1 and I2 will hold provided all validation checks scheduled within a transaction succeed. If they do, then the transaction will commit, else it will abort.

Once all necessary validations have been performed, all the standard commit steps associated with fault-tolerance are performed. In addition to backing up all changes to modified objects, events are shipped to SMILE. For purpose of this discussion, it is assumed that only one committable transaction at a time is engaging in the commit protocol. If this were not the case, it would be necessary to deal with the possibility that transactions might finish committing in a different order than the one at which they started committing, in which case care must be taken to not publish events into SMILE if an event with an earlier logical time might commit.

In the optimistic protocol, aborting can be done for one of three reasons: (1) the user explicitly requests to abort a transaction in progress, (2) a cycle in the waits-for graph is detected, initiating a "locking abort", (3) a "validation abort" happens due to detecting that a transaction read an old, inconsistent value of a D object.

All aborts discard all updates. After a user-initiated abort, the transaction is not re-executed. After a locking abort, all locks are released, and the transaction is re-executed. After a validation abort, all locks are retained, and the transaction is re-executed. After the validation failure, the transaction will have read old values from some D-objects and one or more intervening updates will have occurred that made the old values obsolete. These updated values are now cached so they may be directly read by the re-executing transaction. If the transaction exhibits access invariance, then on re-execution it will perform its reads and writes on the identical objects (though probably writing different values). The locked objects will still have the values they had when the aborted transaction ran for the first time. The D-objects will have the corrected values re-read after executing validation. The re-executed transaction will then be guaranteed to commit at the virtual time it had at the time it was previously validated.

Issues other than concurrency that are faced include fault tolerance, memory requirements and optimization.

Fault tolerance—In the design, a transaction commits when it is both committable from the point of concurrency control, and when the changes to objects in U have been made stable, either by being written to disk or to a backup processor. It is not necessary to wait for changes to objects in D to be made stable. The backup machine typically will not execute the SMILE updates. It will periodically receive checkpoints of the state of D. This state may lag by many transactions behind the state of the primary machine. Only when the primary machine fails will the backup machine start executing SMILE updates to catch up. It is able to do this because as part of committing a transaction, the change to each object in P was logged, and that log was retained until a new checkpoint made that log no longer necessary for recovery.

The SMILE execution engine is deterministic. It can always re-create a state by restoring an earlier checkpoint and replaying the events in logical time order. The concurrency control algorithm allows the state of SMILE to lag arbitrarily behind the state of the transactions, so although there may be more blocked and aborted transactions after a failure, failover will have no effect on correct behavior. In a default approach in which stream processing is executed as part of a transaction, each D-object written by a transaction that publishes events to SMILE would be saved to the log at commit time, whereas in the present approach these D objects would not be logged because they could be reconstructed provided that the log for the update to the P object that initiated the published event is retained.

Memory requirements—It is only required that the latest write time and the latest read time for recently accessed objects be retained. Times that are older than the minimum of the oldest read or write times of an uncommitted transaction, and the time of the latest completed stream processing action can be thrown away. This is because any new conflicts can only happen with newly read D-objects. A newly read D-object will always have a time no earlier that the time of the latest completed stream processing action.

Optimizations—Among the optimizations that may result include the following:

Lock retention on abort—Transactions re-executed after an abort due to validation will be more efficient if they do not release locks, and provided that the values read during validation are cached for reuse during re-execution. In the special case where the re-executed transaction accesses the identical objects, the re-execution can proceed with no delays due to lock acquisition and no possibility of an abort.

Dependencies of D-objects on P-objects—It has been assumed that if a transaction updates a P-object, an asynchronous thread will process an event and might update any of the D-objects. It may be known ahead of time that certain P-objects can only possibly affect some of the D-objects—for example, a P-object representing a stock trade may only affect those D-objects that subscribe to queries whose inputs mathematically depend on the stock trade stream. This knowledge can enable avoiding waiting for SMILE to catch up to every major tick prior to $t_T$. If the only major ticks prior to $t_T$ are associated with published messages known not to affect the D object being validated, it is not necessary to wait for SMILE to catch up to them. This will avoid unnecessary waiting at commit time. In the simulation, this property is exploited only in a limited way: the D objects are divided into groups processed by separate SMILE threads and driven from disjoint sets of P-objects. It is assumed that a published event can only affect the D-objects in its group, but static knowledge that certain P objects will only affect a subset of D-objects in its group is not exploited.

In some event stream query languages, including the one used in SMILE, query results can depend not only on events, but on the passage of time. For instance, a query can say "tell me all service requests not followed by a matching service response within one minute". The result set of such a query will be updated as a result not of an explicitly published event, but of an implicit "timeout event", namely, the tick that happened after an entire response-free minute following a service request.

Figure 9:
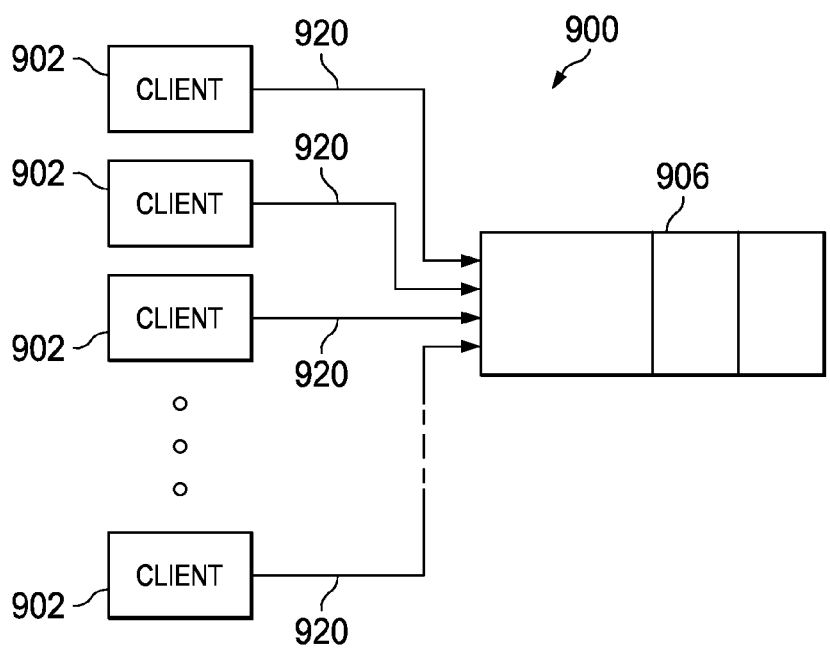
FIG. 9 schematically illustrates a combined event stream processing and transactional object store system according to an illustrative embodiment of the invention.

FIG. 9 schematically illustrates a combined event stream processing and transactional object store system according to an illustrative embodiment of the invention. The system is generally designated by reference number 900, and includes a plurality of clients 902. Clients 902 connect to the system via "sessions"; and once connected, a client may queue a transaction (schematically illustrated by arrows 920) to the system and wait for it to complete. The transaction queue is illustrated at 906. There may be a mix of transaction types:

Non-publishing non-subscribing (NPNS): These do not read D-objects, nor do they write P-objects.

Publishing non-subscribing (PNS): These do not read D-objects but write one or more P-objects.

Pure subscribing (S): These read D-objects only.

Mixed subscribing (MS): These read D-objects and also may read either P-objects or other objects written by transactions that wrote P-objects.

Figure 10:
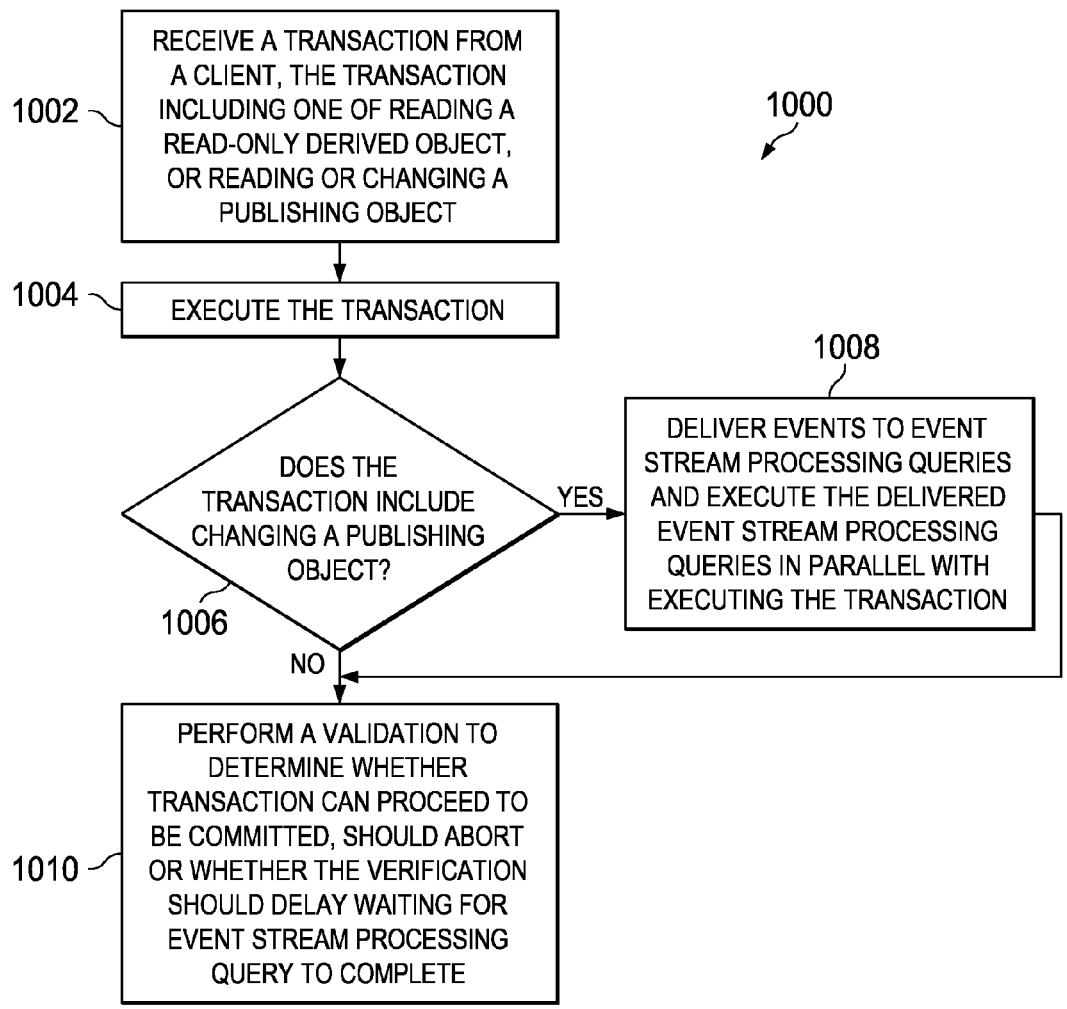
FIG. 10 is a flowchart that illustrates a method for achieving transactional quality of service in a transactional object store system according to an illustrative embodiment of the invention.

FIG. 10 is a flowchart that illustrates a method for achieving transactional quality of service in a transactional object store system according to an illustrative embodiment of the invention. The method is generally designated by reference number 1000, and is implemented in a system that includes at least one client issuing transaction requests, at least one publishing object, at least one read-only derived object, and at least one event stream processing query, wherein a change to the at least one publishing object defines an event to be delivered to one or more of the at least one event stream processing query, wherein a state of the at least one read-only derived object represents a result of an event stream processing query, and wherein the at least one event stream processing query repeatedly receives an event from one or more of the at least one publishing object, determines a result based on a history of events from the one or more publishing object, and delivers the result to a read-only derived object of the at least one read-only derived object of the at least one read-only derived object. The method begins by receiving a transaction from a client of the system (Step 1002), and the transaction is executed (Step 1004). The transaction comprises one of reading a read-only derived object, or reading or changing a publishing object, and ends with one of a decision to request committing the transaction or a decision to request aborting the transaction. After the transaction finishes, and is ready to commit, a determination is made whether the transaction includes, i.e., changing a publishing object (Step 1006). Responsive to a determination that the transaction comprises changing a publishing object, and a decision to request committing the transaction (Yes output of Step 1006), events are delivered to event stream processing queries, and the event stream processing queries are executed in parallel with the executing the transaction (Step 1008). After scheduling such an execution, the method proceeds to step 1010. In all other cases when the transaction is ready to commit (No output of Step 1006), a validation is performed to determine whether the transaction can proceed to be committed, whether the transaction should abort, or whether the validation should delay waiting for an event stream processing query to complete (Step 1010).

The method implement a serializability guarantee that if a first transaction updates a publishing object that triggers an event processing query that updates a derived object, any second transaction occurring logically later must see the updated value of the derived object.

Thus, illustrative embodiments of the present invention provide a computer-implemented method, system and computer usable program code for achieving transactional quality of service in a transactional object store system. The transactional object store system has at least one client issuing transaction requests, at least one publishing object, at least one read-only derived object, and at least one event stream processing query, wherein a change to the at least one publishing object defines an event to be delivered to one or more of the at least one event stream processing query, wherein a state of the at least one read-only derived object represents a result of an event stream processing query, and wherein the at least one event stream processing query repeatedly receives an event from one or more of the at least one publishing object, determines a result based on a history of events from the one or more publishing object, and delivers the result to a read-only derived object of the at least one read-only derived object. A transaction is received from a client of the at least one client. The transaction is executed, wherein the transaction comprises one of reading a read-only derived object of the at least one read-only derived object, reading another object or writing another object, and wherein the transaction ends with one of a decision to request committing the transaction or a decision to request aborting the transaction. Responsive to a decision to request committing the transaction, wherein the transaction comprises writing one of the at least one publishing object, events are delivered to event stream processing queries, and the delivered event stream processing queries are executed in parallel with the executing of the transaction. Responsive to a decision to commit, a validation is performed to determine whether the transaction can proceed to be committed, whether the transaction should abort, or whether the validation should delay waiting for one or more event stream processing queries to complete, wherein if a first transaction updates a publishing object that triggers an event processing query that updates a derived object, any second transaction occurring logically later must see the updated value of the derived object.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for achieving transactional quality of service in a transactional object store system having at least one client issuing transaction requests, at least one publishing object, at least one read-only derived object, and at least one event stream processing query, wherein a change to the at least one publishing object defines an event to be delivered to one or more of the at least one event stream processing query, wherein a state of the at least one read-only derived object represents a result of an event stream processing query, and wherein the at least one event stream processing query repeatedly receives an event from one or more of the at least one publishing object, determines a result based on a history of events from the one or more publishing object, and delivers the result to a read-only derived object of the at least one read-only derived object, the computer-implemented method comprising:

receiving a transaction from a client of the at least one client;

executing the transaction, wherein the transaction comprises one of reading a read-only derived object of the at least one read-only derived object, reading another object or writing another object, and wherein the transaction ends with one of a decision to request committing the transaction or a decision to request aborting the transaction;

responsive to a decision to request committing the transaction, wherein the transaction comprises writing one of the at least one publishing object, delivering events to event stream processing queries, and executing the delivered event stream processing queries in parallel with the executing of the transaction; and responsive to a decision to request committing a transaction that comprises reading one of the at least one read-only derived object, performing a validation to determine whether the transaction can proceed to be committed, whether the transaction should abort, or whether the validation should delay waiting for one or more event stream processing queries to complete, wherein if a first transaction updates a publishing object that triggers an event processing query that updates a derived object, any second transaction occurring logically later must see the updated value of the derived object.

2. The computer-implemented method of claim 1, further comprising:

assigning a tentative logical time to the transaction;

remembering latest read and write times for objects recently read and written; and using the tentative logical time to determine whether it is necessary to perform one of:

adjusting the tentative logical time;

entering an optimistic state wherein the transaction is valid only if the validation succeeds; and aborting the transaction.

3. The computer-implemented method of claim 2, wherein the validation succeeds if a particular derived object does not change in a particular range of logical times.

4. The computer-implemented method of claim 3, wherein the transaction is aborted if the particular derived object changes in the particular range of logical times.

5. The computer-implemented method of claim 1, wherein the transaction comprises a reading operation, and wherein the tentative logical time is adjusted according to whether a latest operation on the object was a read operation or a write operation.

6. The computer-implemented method of claim 1, wherein the transaction comprises a writing operation, and wherein the tentative logical time is adjusted according to a time of a latest read or write operation.

7. The computer-implemented method of claim 1, wherein the transactional object store system comprises an Object-Grid transactional system.

8. A computer program product stored in a non-transitory computer usable device having computer usable program code embodied therein for achieving transactional quality of service in a transactional object store system having at least one client issuing transaction requests, at least one publishing object, at least one read-only derived object, and at least one event stream processing query, wherein a change to the at least one publishing object defines an event to be delivered to one or more of the at least one event stream processing query, wherein a state of the at least one read-only derived object represents a result of an event stream processing query, and wherein the at least one event stream processing query repeatedly receives an event from one or more of the at least one publishing object, determines a result based on a history of events from the one or more publishing object, and delivers the result to a read-only derived object of the at least one read-only derived object, the computer program product comprising:
  computer usable program code configured for receiving a transaction from a client of the at least one client;
  computer usable program code configured for executing the transaction, wherein the transaction comprises one of reading a read-only derived object of the at least one read-only derived object, reading another object or writing another object, and wherein the transaction ends with one of a decision to request committing the transaction or a decision to request aborting the transaction;
  responsive to a decision to request committing the transaction, wherein the transaction comprises writing one of the at least one publishing object, computer usable program code configured for delivering events to event stream processing queries, and for executing the delivered event stream processing queries in parallel with the executing of the transaction; and
  responsive to a decision to request committing a transaction that comprises reading one of the at least one read-only derived object, computer usable program code configured for performing a validation to determine whether the transaction can proceed to be committed, whether the transaction should abort, or whether the validation should delay waiting for one or more event stream processing queries to complete,
  wherein if a first transaction updates a publishing object that triggers an event processing query that updates a derived object, any second transaction occurring logically later must see the updated value of the derived object.

9. The computer program of claim 8, further comprising:
  computer usable program code configured for assigning a tentative logical time to the transaction;
  computer usable program code configured for remembering latest read and write times for objects recently read and written; and
  computer usable program code configured for using the tentative logical time to determine whether it is necessary to perform one of:
    adjusting the tentative logical time;
    entering an optimistic state wherein the transaction is valid only if the validation succeeds; and
    aborting the transaction.

10. The computer program product of claim 9, wherein the validation succeeds if a particular derived object does not change in a particular range of logical times.

11. The computer program product of claim 10, wherein the transaction is aborted if the particular derived object changes in the particular range of logical times.

12. The computer program product of claim 8, wherein the transaction comprises a reading operation, and wherein the tentative logical time is adjusted according to whether a latest operation on the object was a read operation or a write operation.

13. The computer program product of claim 8, wherein the transaction comprises a writing operation, and wherein the tentative logical time is adjusted according to a time of a latest read or write operation.

14. A transactional object store system for achieving transactional quality of service in a transactional object store system having at least one client issuing transaction requests, at least one publishing object, at least one read-only derived object, and at least one event stream processing query, wherein a change to the at least one publishing object defines an event to be delivered to one or more of the at least one event stream processing query, wherein a state of the at least one read-only derived object represents a result of an event stream processing query, and wherein the at least one event stream processing query repeatedly receives an event from one or more of the at least one publishing object, determines a result based on a history of events from the one or more publishing object, and delivers the result to a read-only derived object of the at least one read-only derived object, the transactional object store system comprising:
  a bus;
  a memory connected to the bus, wherein the memory comprises computer executable instructions;
  a communication unit connected to the bus;
  a processor unit connected to the bus, wherein the processor unit executes the computer executable instructions to direct the transactional object store system to:
  execute a transaction received from a client of the at least one client, wherein the transaction comprises one of reading a read-only derived object of the at least one read-only derived object, reading another object or writing another object, and wherein the transaction ends with one of a decision to request committing the transaction or a decision to request aborting the transaction;
  responsive to a decision to request committing the transaction, wherein the transaction comprises writing one of the at least one publishing object, deliver events to event stream processing queries, and for executing the delivered event stream processing queries in parallel with the executing of the transaction; and
  responsive to a decision to request committing a transaction that comprises reading one of the at least one read-only derived object, perform a validation to determine whether the transaction can proceed to be committed, whether the transaction should abort, or whether the validation should delay waiting for one or more event stream processing queries to complete,
  wherein if a first transaction updates a publishing object that triggers an event processing query that updates a derived object, any second transaction occurring logically later must see the updated value of the derived object.

15. The transactional object store system of claim 14, wherein the processor unit further executes the computer executable instructions to direct the transactional object store system to:
  assign a tentative logical time to the transaction;
  remember latest read and write times for objects recently read and written; and use the tentative logical time to determine whether it is necessary to perform one of:
adjusting the tentative logical time;
entering an optimistic state wherein the transaction is valid only if the validation succeeds; and
aborting the transaction.

16. The transactional object store system of claim 15, wherein the validation succeeds if a particular derived object does not change in a particular range of logical times.

17. The transactional object store system of claim 16, wherein the transaction is aborted if the particular derived object changes in the particular range of logical times.

18. The transactional object store system of claim 14, wherein the transaction comprises a reading operation, and wherein the tentative logical time is adjusted according to whether a latest operation on the object was a read operation or a write operation.

19. The transactional object store system of claim 14, wherein the transaction comprises a writing operation, and wherein the tentative logical time is adjusted according to a time of a latest read or write operation.

20. The transactional object store system of claim 14, wherein the transactional object store system comprises an ObjectGrid transactional system.

* * * * *